United States Patent [19]

Schindler

[11] Patent Number: 4,470,742
[45] Date of Patent: Sep. 11, 1984

[54] STORING PLANT

[75] Inventor: Claude L. Schindler, 14, rue du Conseil Général, 1205 Geneva, Switzerland

[73] Assignees: Claude Louis Schindler, Geneva; Durafourg & Cie, Lausanne; Sibonne S.A., Fribourg, all of Switzerland; a part interest to each

[21] Appl. No.: 253,515
[22] PCT Filed: Aug. 18, 1980
[86] PCT No.: PCT/CH80/00098
§ 371 Date: Apr. 13, 1981
§ 102(e) Date: Apr. 13, 1981
[87] PCT Pub. No.: WO81/00552
PCT Pub. Date: Mar. 5, 1981

[30] Foreign Application Priority Data

Aug. 21, 1979 [CH] Switzerland .............. 7606/79

[51] Int. Cl.³ .............................................. B65G 1/00
[52] U.S. Cl. ........................... 414/286; 104/162;
104/172 B; 105/177; 198/472; 293/131;
414/236; 414/267
[58] Field of Search ............. 414/267, 268, 277, 330,
414/284, 286, 331, 236, 239, 460; 104/48, 162,
172 B; 105/177; 301/134; 293/126, 127, 131,
132; 238/127, 128, 137, 142, 148; 246/454, 455,
457, 466, 467; 198/472, 580, 741, 742

[56] References Cited

U.S. PATENT DOCUMENTS

| 781,819 | 2/1905 | Frackmann | 238/128 |
| 995,369 | 6/1911 | Plimpton | 238/128 |
| 1,976,068 | 10/1934 | Higbee | 301/134 |
| 2,762,515 | 9/1956 | Ingold | 414/239 |
| 3,038,415 | 6/1962 | Ingold | 414/326 |
| 3,473,645 | 10/1969 | Kidd | 198/742 |
| 3,730,358 | 5/1973 | Oji | 414/460 |
| 3,821,934 | 7/1974 | Maeda | 104/162 |
| 3,823,968 | 7/1974 | Barenyi | 293/131 |
| 3,973,685 | 8/1976 | Loomer | 414/284 |
| 4,273,053 | 6/1981 | Gibbs | 414/236 |
| 4,273,494 | 6/1981 | Swain et al. | 414/284 |

FOREIGN PATENT DOCUMENTS

1400536 4/1964 France .
1283923 8/1972 United Kingdom .............. 414/266

Primary Examiner—Robert B. Reeves
Assistant Examiner—Donald Hajec
Attorney, Agent, or Firm—Kane, Dalsimer, Kane, Sullivan and Kurucz

[57] ABSTRACT

The plant comprises a carrier structure formed by a network of orthogonal paths (1,2) on which carriages to be stored (5) are capable to move in two directions (xy). The displacement along (y) is provided by a robot carriage (18) carried by a carrier carriage (23) moving on a side path (24,25). The displacement of carriages along (x) is provided by bars (11) provided with pneumatic fingers (17). The carriages are either provided with two wheel trains (8,9) with axles perpendicular between each other and of which the running planes are at different levels, or provided with pads allowing the carriages to move by sliding. When the carriages run on their high wheels (9), the low wheels (8) are free in clearing channels (10). The carrier structure may be completely full except for at least one transversal row (y). For the purpose of its withdrawal, a carriage is isolated in the free row, previously displaced if required by displacement along (x) of the neighbouring carriages.

13 Claims, 13 Drawing Figures

STORING PLANT

This invention relates to a storage plant, particularly but not exclusively for the storage of palletized goods.

In known warehouses, pallets and their loads are simply arranged side by side on one or more levels. The displacement of loaded pallets requires bulky, slow-acting and expensive transporting and lifting equipments, and requires relatively broad access passageways whenever it is desired to have the possibility of picking up any pallet from the warehouse at any time. Now these access passageways involve a considerable loss of useful space in the warehouse exploitation. Furthermore, it is necessary to add high cost for labor and maintenance.

Various solutions have already been proposed for mechanizing storage systems and taking the maximum advantage of the storage space available, but these proportions appear to be complicated and require heavy, expensive equipments. As an example of prior art is cited the Patent GB No. 1,512,396 wherein the carrier storage structure is divided into units comprising each several tiers of two rows each, movable on rails, each unit being adapted to be driven laterally by means of a separate motor. A carriage adapted to travel along these units carries a tower provided with a platform elevator movable between two storage units. To reach a predetermined storage location it is generally necessary to shift at least one, and more frequently several, storage units weighing tens or even hundreds of tons, in order to clear a passageway for the tower.

In another system described in the Patent CH No. 496,598 a main passageway must be kept free under all circumstances, plus at least one auxiliary passageway, and a pick-up tower is driven along this auxiliary passageway. In addition, the space is divided into different kinds of stores as free areas must be reserved in the store where the handling takes place. This system is also complicated and expensive, and involves the displacement of heavy assemblies. The floor space available is not utilized in an optimal way.

It is the object of the present invention to increase the space available for storage purposes while minimizing the volume occupied by the access passageways and reserving the possibility of picking up at any time goods from any location in the warehouse, by using simple, rapid and low-energy consumption means.

The storing plant according to this invention is characterized in that it comprises a carrier structure extending throughout at least one level and comprising a plurality of paths constituting an orthogonal network, carriages adapted to travel on said paths in two perpendicular directions of said network, first means for moving said carriages or the loads thereof along a complete transverse row in a first direction (y) and second means for moving said carriages in a second direction (x) perpendicular to y through a distance corresponding to a transverse row, whereby the complete carriage supporting structure can be filled except for at least one transverse row, with the possibility of removing one carriage or the load thereof from any desired location by causing all the carriages of the transverse row involved, which are disposed on either side of the carriage or load to be removed, to move laterally through a distance corresponding to one transverse row, together with the neighbouring carriages lying on the same longitudinal rows as the carriages thus moved, so that the carriage or the load to be removed be isolated in the thus displaced free transverse row.

It will be readily understood that the invention consists in shifting the free row by moving a group of carriages and isolating the carriage to be removed from the storage surface area in the thus shifted free row. Therefore, the only requirement to be met is to keep a single free row throughout the storage surface area. However, if the longitudinal dimension of the warehouse is relatively great, it will be better to provide several free passageways to prevent the simultaneous shifting of an too much great number of carriages. The carriage removed from the storage surface area leaves an empty place into which another carriage can be introduced immediately.

The stored goods, whether in the form of palletized articles, parcels or other materials, or any other products or objects, are brought in on carriages and discharged by using conventional handling means such as conveyor belts, bucket-chains and so on.

The storing plant according to this invention can be used for storing any desired objects or goods, particularly for handling vehicles in an automatic car park.

According to a form of embodiment of this invention, the carriages are each provided with two trains of wheels having their axes disposed at right angles to each other, with the wheel races of one train of wheels shifted vertically in relation to the wheel races of the other train of wheels, the tracks on which the carriages are caused to travel on said upper train of wheels being provided with a clearance for the lower train of wheels.

According to another form of embodiment of the invention, the carriages are simply provided with four shoes adapted to slide on smooth plain, eventually lubrified, surfaces, so that the carriages can be caused to travel in any direction and notably in the two orthogonal directions of the network. In the case of a cold store, these smooth surfaces may consist of a frozen liquid, for instance water.

The accompanying drawings illustrate by way of example, a form of embodiment of the invention.

Figure 1:
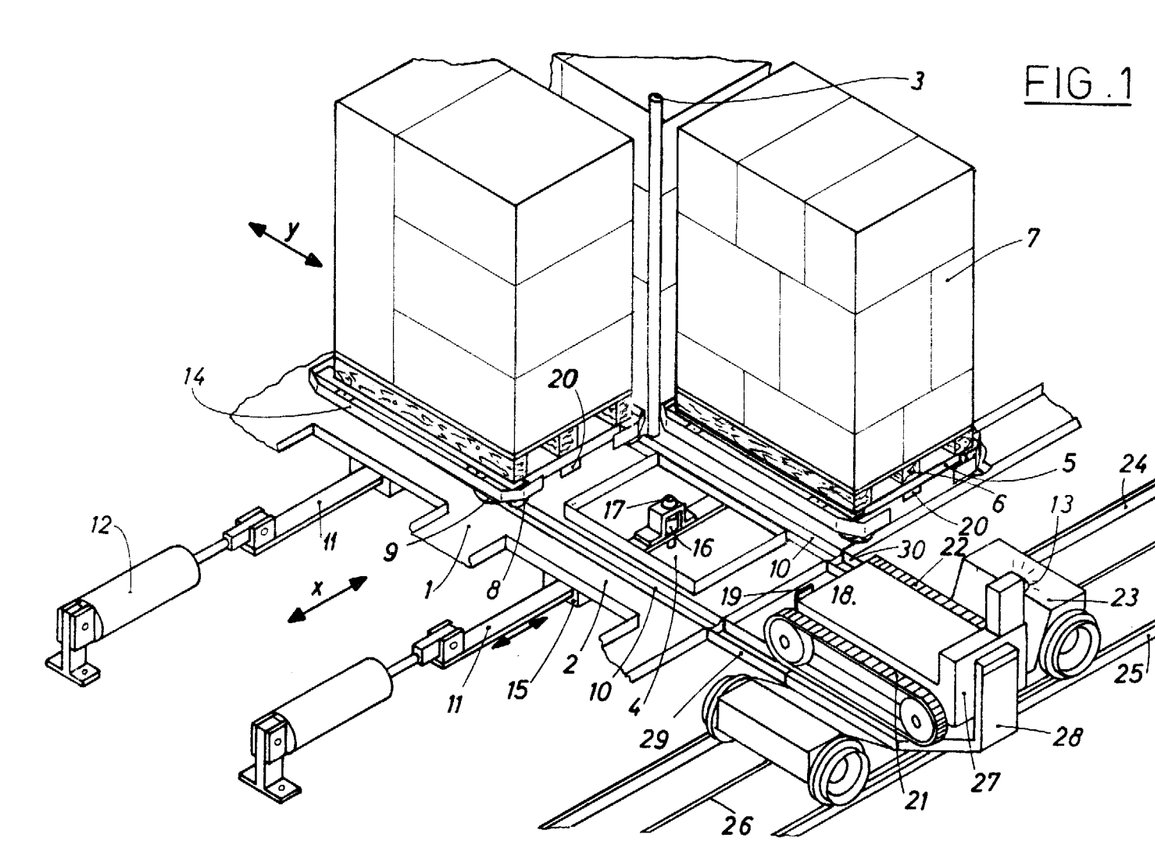
FIG. 1 is a fragmentary perspective view of the carrier structure with carriage means.

We refer first to FIG. 1. The supporting structure comprises a network of orthogonal paths 1 and 2 carried by posts 3 fastened to the floor and ceiling or roof of warehouse, and adapted to carry a plurality of similar supporting structure disposed on several levels. Between the tracks 1 and 2 free rectangular areas 4 are left. A plurality of carriages 5 adapted to hold a load, in this example pallets 6 with their load 7, are adapted to travel on the supporting structure. The carriages 5 are provided with two four-wheel trains 8,9, of which the axes extend at right angles to each other, the rolling plane of wheels 8 being at a somewhat lower level than that of wheels 9. The carriages can thus roll with wheels 8 on tracks 1 in the x-direction, and with wheels 9 on tracks 2 in the y-direction. When the carriage travels on track 2 engaged by its wheels 9, the other wheels 8 move freely in clearance channels 10 extending along the tracks 2. In its inoperative or storage position, each carriage overlies a free rectangular space 4. The carriages 5 are provided on either side with bumpers 14 the mode of operation of which will be explained presently.

In the following disclosure, reference will be made to longitudinal rows extending in the x-direction and of transverse rows extending in the y-direction, since the major side of the supporting structure will in most instance extend in the x-direction and the minor side in the y-direction, in order to limit the length of the free row extending in said y-direction and consequently the vacant space, through energy requirements (e.g. the masses to be shifted) may induce one to decide in favor of the contrary arrangement. A movable bar 11 operatively connected to a double-acting cylinder 12 secured to the edge of the supporting structure extends beneath each longitudinal row of this structure. The bars 11 are slidably movable in guide members 15 secured from underneath to the structure and carry in front of each free space 4 a pneumatic driving device 16 comprising a vertically movable pin 17 constantly urged to its lower or retracted position by a return spring, not shown. As will be explained presently, this device 16 is used for driving the carriages 5 in the longitudinal direction (x). Each device 16 is operatively connected to a pneumatic control circuit. Alternatively chains extending longitudinally beneath said carrier structure, registering with free spaces 29 may be provided with pins for shifting the carriages in the x-direction. The chains also connect to cylinder 12 and perform the same way as bars 11.

In the perpendicular or y-direction the carriages 5 are driven by means of a robot or remote-controlled carriage 18 provided for this purpose at its front end with an electromagnetically operated tilting draw-hook 19 adapted to engage from beneath a matching element 20 provided on the carriage and consisting of a simple vertical plate or a bent lug. Subsequent to its hooking engagement with the carriage 5, the draw-hook 19 is adapted to recede for a reason to be explained presently. Any other suitable and known automatic coupling means may be used for this purpose. This coupling device may be operative only in the tractive mode, since in the other direction the robot carriage 18 may simply push the carriages. The robot carriage 18 is electrically operated and provided with batteries. It is provided with a pair of strongly adherent endless belts 21,22 of rubber or synthetic materials, so that it can travel on tracks 2 in-line with the wheels 9. When inoperative, this robot carriage 18 is carried by another robot or carrier carriage 23 travelling on a pair of rails 24 and 25 parallel to the carriage structure. This carrier carriage 23 is caused to move along the rails 24 and 25 by means of a rope 26 supporting on the other hand an electric supply cable for charging the storage batteries of the robot carriage 18. For this purpose, the first robot carriage 18 comprises at its rear end 27 male or female plug-in means adapted to engage matching or homologue female or male plug-in means carried by an upstanding member 28 of supporting carriage 23 which also acts as a means for retaining the robot carriage 18. The supporting carriage 23 is further provided with a pair of lateral U-sectioned rails 29 and 30 the length of which is equal to that of a load carriage 5, i.e. somewhat greater than the length shown in the drawings. These rails 29 and 30 being adapted to support and be engaged by the carriage 5 to be removed from the carrier structure so as to subsequently discharge same by means of the carrier carriage 23, or conversely, bring such a carriage 5 into the storage area. The robot carriage 18 is stopped by means of an opto-electronic device 13 cooperating with the columns 3 and associated with a counter. Devices of this character, which are adapted to emit control signals when their light beam is interrupted by a near object, for example at a distance of 200 to 300 mm, are well known. They are advantageous in that they permit of dispensing with the use of a receiving cell.

The robot carriage 18 is also adapted to roll in rails 29 and 30 when is leaves its carrier carriage 23 before engaging paths 2. The carrier carriage 23 is stopped automatically under the control of indexing means disposed in the front of the cleared transverse row.

The bars 11 are shown only diagrammatically in the drawings. They consist advantageously of inverted U-section rails movable on grooved rollers rotatably mounted in said guide members 15 and in which the pipings for the pneumatic devices 16 are safely nested.

Figures 2, 4:
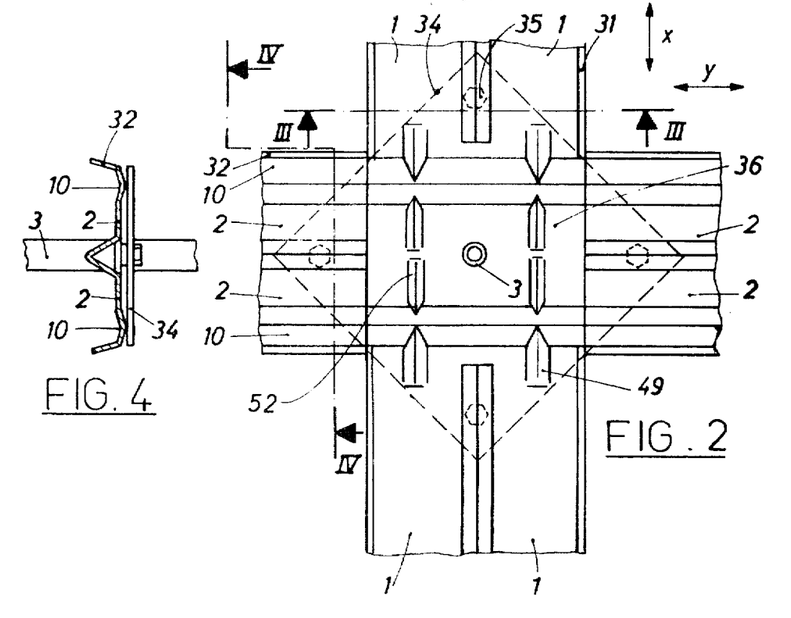
FIG. 2 is a plane view from above showing a track crossing.
FIG. 4 is a section taken along the line IV—IV of FIG. 2.
Figure 3:
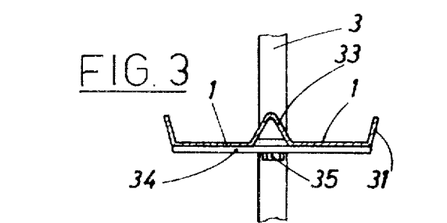
FIG. 3 is a part-elevational, part-sectional view taken along the line III—III of FIG. 2.

The component elements of the carrier structure illustrated only diagrammatically in FIG. 1 are shown more in detail in FIGS. 2, 3 and 4. FIG. 2 illustrates in plane view a crossing between two paths 1 and 2, or more exactly half-paths. In fact, the paths consist of plates 31 and 32 pressed to a substantially W-shaped cross-sectional contour, thus providing a double path or two half-paths separated by a central rib 33 imparting the necessary stiffness to the path structure, for two parallel paths. The side wings further enhance the path rigidity and constitute a lateral safety guard for the carriage. The clearance channels 10 have a substantially V-shaped shallow cross-section of a depth just sufficient to provide the necessity clearance for the lower set of wheels 8 while enabling these lower wheels 8 to re-engage paths 1 after rolling on a moderately inclined ramp. The path forming elements are assembled very simply at right angles to each other by means of a square plate 34 disposed in lozenge fashion and fastened to the carrier column 3 through any suitable means. This plate 34 is secured to the paths by means of bolts 35. The centre of the path crossing consists of a square plate 36 without any central rib, so as to interconnect both paths 2 and paths 1. Therefore, the system is a modular one and can be assembled very rapidly. Moreover, it is provided with recesses 49 for the lower wheels, for a purpose to be explained presently, and with recesses 52 for positioning the upper wheels 9 in the y-direction.

The carriages 5 comprise a steel tube frame (FIGS. 5 and 6) provided with an intermediate cross member 37 to which means for driving the carriage in the longitudinal (x) direction are secured, said means consisting of a pair of metal V-shaped elements 38 and 39 located substantially between the centre and one end of the carriage, respectively.

Figure 5:
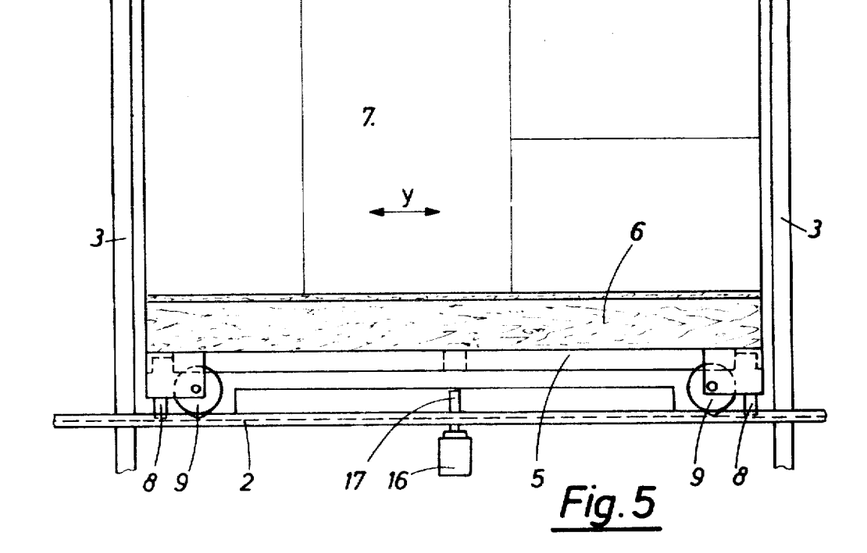
FIG. 5 is a side elevational view showing a carriage with its load.
Figure 6:
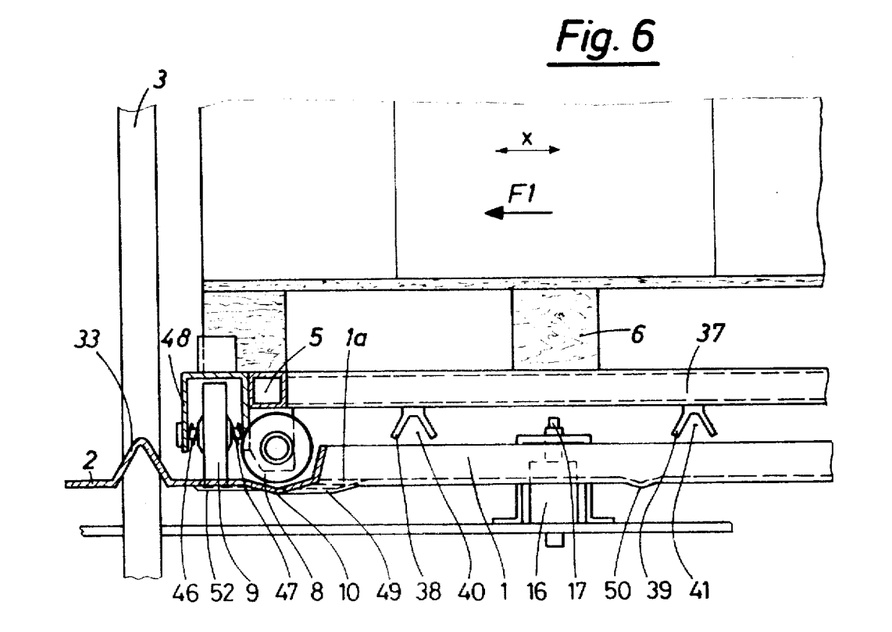
FIG. 6 is a fragmentary front elevational view of the same carriage showing the wheels.

These elements 38 and 39 provide a pair of inverted-V recesses 40 and 41.

FIG. 6 illustrates the mounting for loose rotation of the upper wheels 9 about their axles between a pair of springs 46 and 47, and inside a strap 48. With this mounting, each wheel 9 is allowed a limited axial movement. The same FIG. 6 shows the recess 49 provided at the junction between path 1 and clearance channel 10. This recess 49 provides a clearance for the upper wheel 9 when the latter is moved in a direction parallel to its axis when the carriage 5 is travelling on a crossing in the direction of the arrow F1. During this movement, when the wheels at the right-hand end (not shown) of the carriage engage the crossing, the wheels 8 must cross the clearance channel 10 and therefore actually drop into this channel. Then the recesses 49 prevent the upper wheels 9 to skid laterally on path 1. Registering with said recesses 49 are shallower cavities 52 engageable by the upper wheels 9 in order properly to position the carriage in the y-direction.

Figure 8:
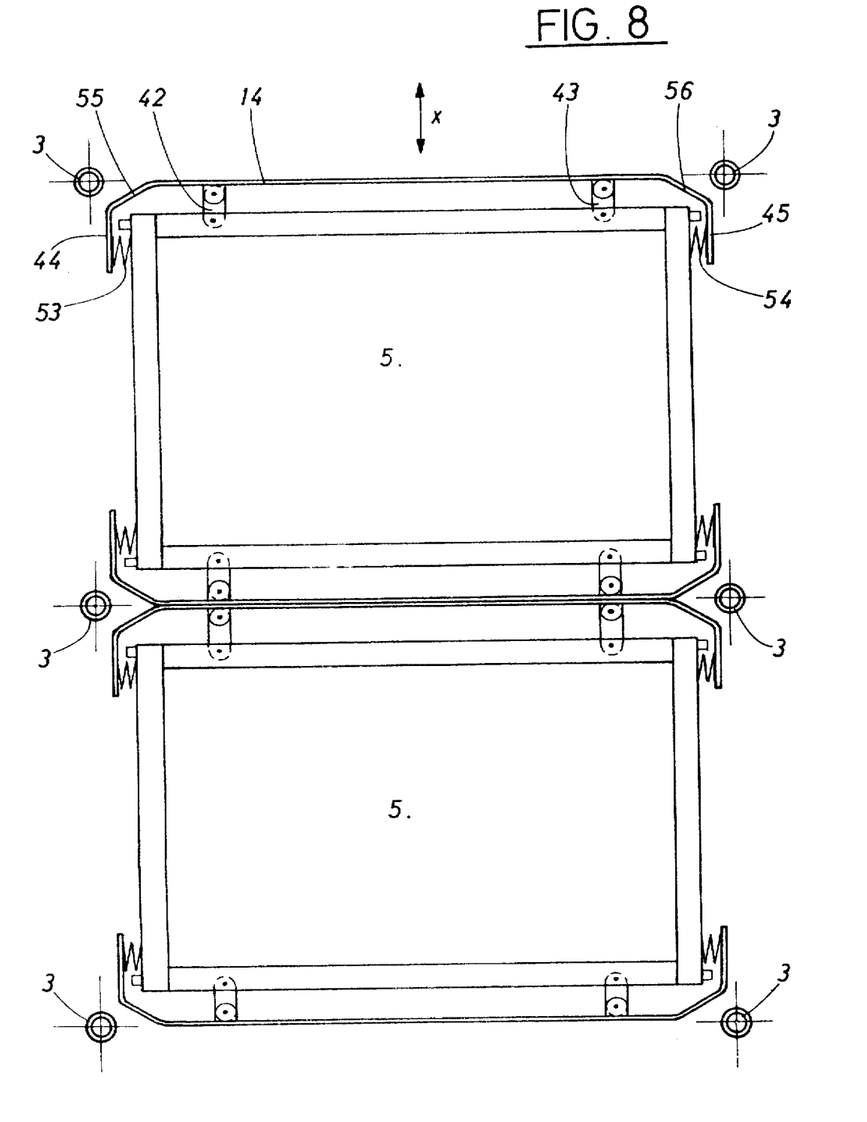
FIG. 8 is a diagrammatical plane view from above showing a pair of carriages in their inoperative position.

The bumpers 14 are mounted on the carriages by means of a pair of links 42,43 (FIG. 8) having vertical pivot pins. The ends 44 and 45 of each bumper are bent back to form an angle of about 90° with the main portions thereof. Mounted between these ends and the carriage proper are spring means such as coil compression springs 53 and 54 constantly urging the bumpers 14 to their positions shown in FIG. 8. The bent end portions 44,45 are connected to the main portion of the bumper through oblique portions 55,56 constituting ramps or cam faces adapted to cooperate with columns 3 for properly guiding the carriages.

Figure 9:
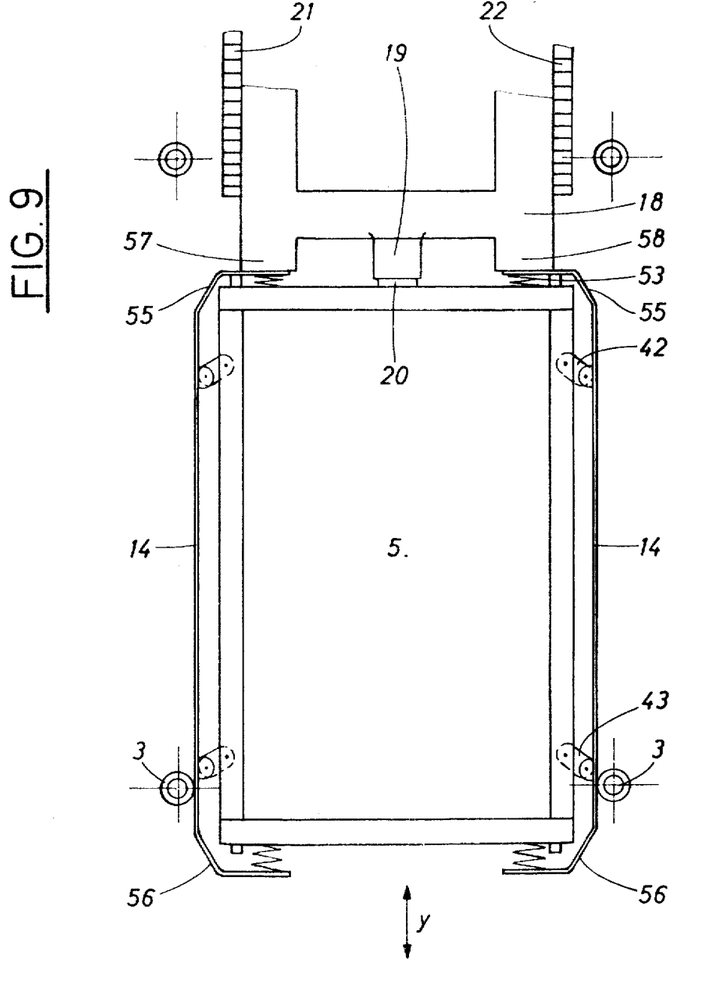
FIG. 9 is a diagrammatic plane view from above showing a travelling carriage being pushed or pulled by a robot carriage.

In the inoperative position (FIG. 8), the overall width of the load carriages 5 is slightly in excess of the distance between two columns 3. Therefore, the carriages cannot move uncontrollably from one location to another. To permit this transfer, the bumpers 14 must be retracted as shown in FIG. 9. This movement is obtained by a pressure exerted by the robot carriage 18. When the robot carriage 18 is actuated to pick up a load carriage 5 its draw-hook 19 engages the matching element 20 of this carriage 5 and pulls same while pressing by means of buffers 57,58 the bent end portions of bumpers 14 and compressing their return springs 53 and 54. Thus, the bumpers 14 are moved and pivot the corresponding links 42 and 43, so that the bumpers are moved towards the carriage 5 and the overall width thereof is reduced to permit its passage between adjacent columns 3 with a sufficient clearance. The cam faces 55,56 may possibly strike the columns 3, and this will re-align the carriage 5. When the robot carriage 18 releases the load carriage 5, the bumpers 14 thereof resume their initial position and this carriage 5 is retained between columns 3 in the y-direction (FIG. 9).

The bumpers 14 act as buffer means between the various carriages 5 in the x-direction. In this direction, the bent end portions 44,45 can slide on the adjacent columns 3 to guide the carriage. Return means other than the springs 53 and 54 illustrated may be contemplated, such as inherent resiliency of the bumpers, the latter yielding at any point, or alternatively gravity may be used for pivoting the links 42,43.

Figure 7:
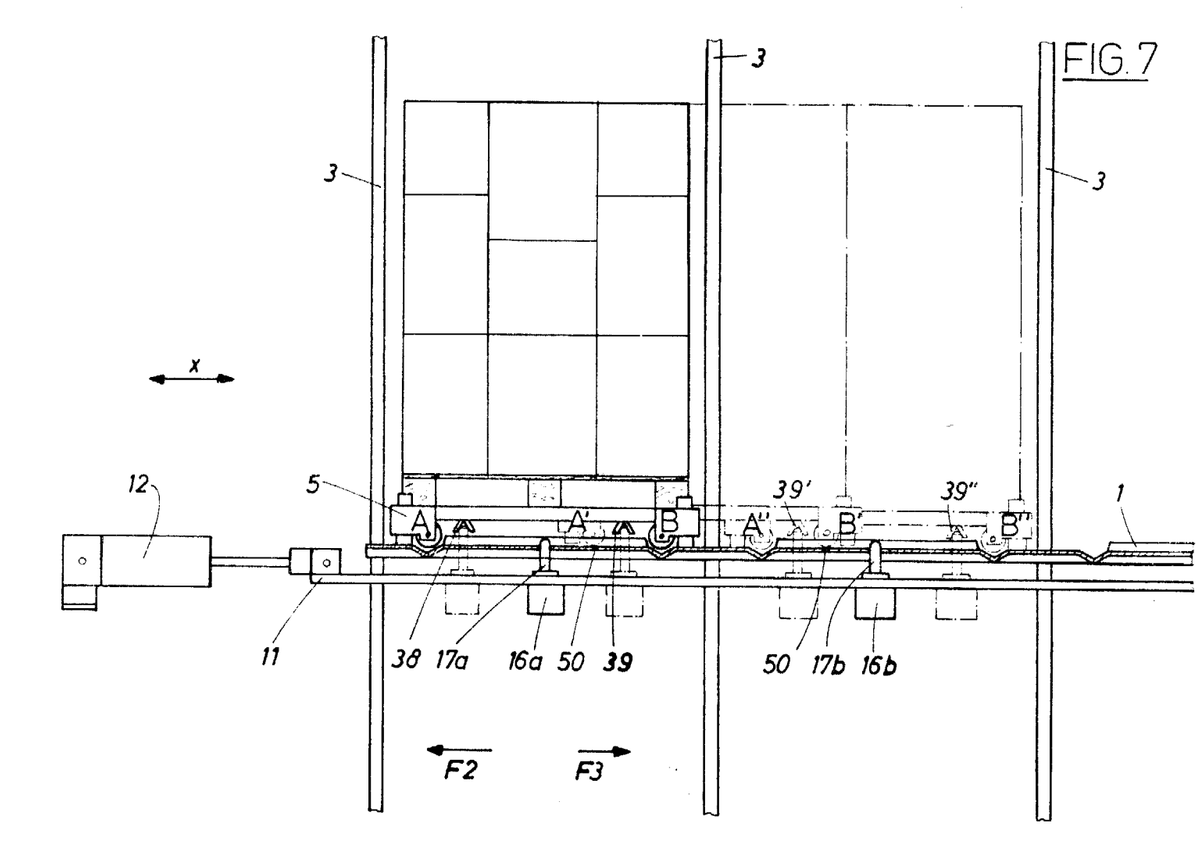
FIG. 7 is an elevational view showing the lateral movement of the carriages.

The plant operates in the following manner:

At least one transverse passageway (y) is constantly kept free of carriages 5. Assuming first that it is desired to drive a loaded carriage to the storage area. This carriage 5 and its load are brought by means of the carrier carriage 23 onto its rails 29,30 in proper alignment with the free passageway. Then the carriage 5 is pushed by the robot carriage 18 remote controlled through any known cybernetic system into the free passageway, until it registers with a free location 4 adjacent this passageway. The robot carriage 18 is stopped under the control of the relevant opto-electronic device 13 and of the counter associated therewith which counts the columns 3. When released by the robot carriage 18, the load carriage 5 is positioned by the engagement of its upper wheels 9 in recesses 52. Subsequently, this carriage 5 is moved in the perpendicular direction x by means of bar 11, as illustrated in FIG. 7. The initial position of carriage 5 is shown in thick lines and by the letters A and B. The bar 11 extending beneath the carriage 5 to be shifted is firstly driven in direction F2 by its cylinder 12. At the end of this stroke, the vertical pin 17a registers with the first inverted-V recess 38 and the pneumatic device 16 is actuated to raise this pin 17 for engagement into the overlying recess 38. Then bar 11 is driven in the opposite direction F3 and carries along the carriage 5 to position A'—B' shown in phantom lines. The second recess 39 is then in position 39'. The carriage 5 is released by retracting pin 17a, but it is safely retained in this position by a very shallow depression 50 formed in the path under the wheels 8. The bar 11 is again moved in the direction of the arrow F2 and the adjacent pin 17b engages the second recess 39 in position 39' to drive the carriage in the direction of the arrow F3 to position A"—B". From the foregoing, it is obvious that the carriage shifting movement takes place in two steps or half-strokes.

To remove a load carriage 5 disposed at any location in the storage area, i.e. generally from a place not located along the free passageway, the following procedure is adherent to: by means of the bars 11 and their vertical pins 17 the carriages 5 lying on a y-row on either side of the carriage to be removed, and with them the carriages lying in front of said carriages, in the x-direction, are shifted towards the free passageway. The result of this is a shifting of the free passageway, the carriage 5 to be removed lying in the thus shifted and cleared passageway. It is so only necessary to fetch this carriage 5 by using the robot carriage 18 which, by means of its automatic draw-hook 19, engages the matching element 20 of carriage 5 and transfers this carriage 5 to the rails 29 and 30 of supporting robot carriage 23 which is thus enabled to drive the carriage 5 with its load on rail 24 and 25.

Figure 10:
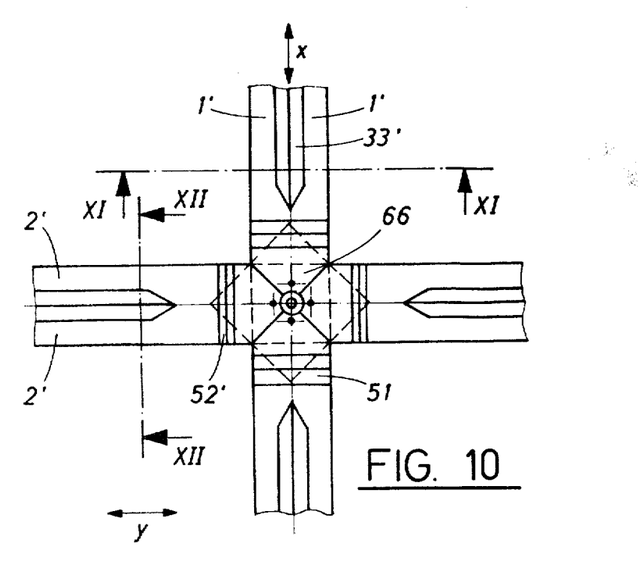
FIGS. 10, 11 and 12 illustrate a modified form of embodiment of the paths and correspond to the views of FIGS. 2, 3 and 4.
Figure 11:
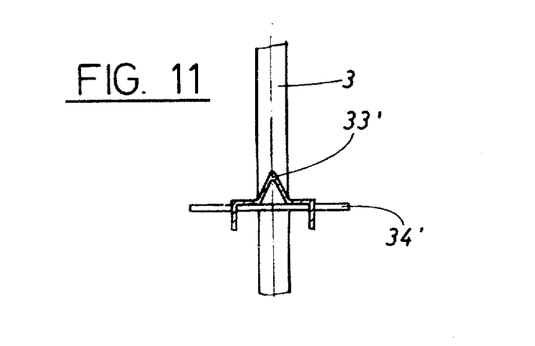
Figure 12:
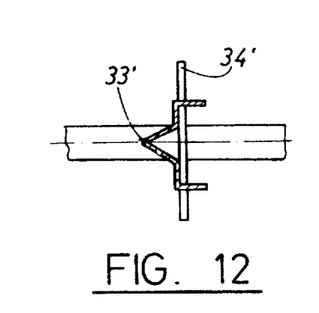

FIGS. 10,11 and 12 illustrate a simplified and preferred form of embodiment of the paths. In this modified construction the paths 1' and 2' consist of identical pressed metal sheets identical with, but narrower than, the W-sectioned elements of the preceding form of embodiment shown notably in FIGS. 2,3 and 4. In this alternate structure the sheet metal elements are pressed to a substantially U-shaped cross-sectional countour, with the side wings pointing downwards. A central rib 33' acts both as a stiffening member and as a guide rail. These pressed plates 1', 2' are assembled directly by their wedge-shaped ends 66 fastened to a common square plate 34' rigid with column 3. Paths 1' are simply provided with an open-V recess 51 permitting the passage of the lower wheels 8 when the carriage travels on path 2' by rolling on its upper wheels 9. In the other positions the lower wheels 8 are disposed laterally and externally of paths 2'. The clearances 49 can be dispensed with. Furthermore, paths 2' are provided with a recess 52' for positioning the carriage 5 in the y-direction by means of its upper wheels 9.

Figure 13:
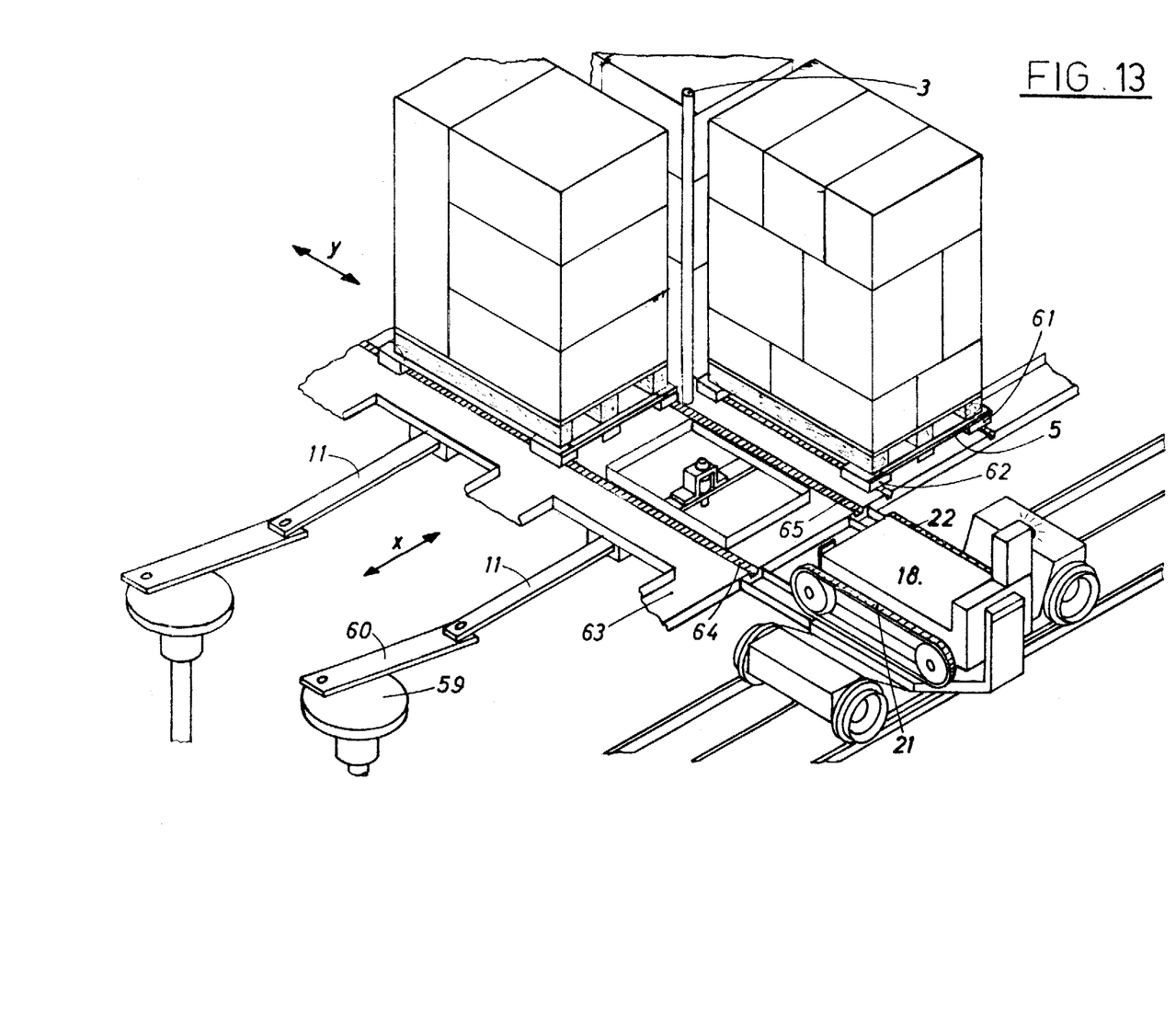
FIG. 13 illustrates a modified form of embodiment of the plant using shoes.

FIG. 13 illustrates another modified form of embodiment in which the carriages 5 are simply provided with slide shoes such as 61 and 62, and the paths consist of smooth, plain surfaces 63 having a very low coefficient of friction. In the y-direction the paths are provided with a pair of channels 64,65, having preferably a corrugated surface to improve the grip of the endless belts or tracks 21 and 22 of robot carriage 18. These channels 64,65 are narrower than the shoes 61,62, so that the latter can move freely above the former. The other component elements are the same as those shown in FIG. 1, except the means for driving the shift bars 11 which in this modified structure consist of eccentric pins carried by a disk 59 and connected through links 60 to the driven end of bar 11. The materials constituting the smooth track surface and the shoes are selected to be complementary to each other, in order to minimize the coefficient of friction therebetween. Thus, the following materials may be used: steel on Teflon (Registered Trade Mark); oiled wood on polished steel; nylon on gel. In the case of a cold store, a sliding surface may be obtained by using a frozen liquid, for instance water.

Moreover, it is worth pointing out that the carrier structure, including the columns 3, may also constitute at the same time the frame structure of the warehouse.

Many modifications may be brought to the exemplary form of embodiment shown and described herein, without departing inasmuch from the basic principles of the invention. Thus, for example, for the storage of pallets it is possible to provide carriages 5 movable only along the x-axis, the robot carriage 18 being provided in this case with a fork lift device for picking up or depositing the pallets from and upon the carriages. With this arrangement it is possible to use carriages having only four wheels and a more simplest path design. The carriages may be provided or not with simple buffers in said x-direction.

The carriages may have other shapes than the square or rectangular shape illustrated. The carriages may be designed for receiving any desired load, notably slip-sheet loads or the like.

The upper and lower wheels may be inverted. With this inversion it is possible to reduce the actuator power by providing a recess, bounded by two ramps, between columns 3 in the x-direction.

Hydraulic, mechanical or electrical means may be provided for controlling the vertical pins 17. The cylinders or actuator 12 may be replaced by any equivalent means.

In the case of carriages having only four wheels for travelling in the x-direction, the translation in the other or perpendicular y-direction may be obtained by lifting the carriages, for example by using a battery.operated fork lift truck of which the wheel-mounted forks are engaged under the carriage frame externally of the wheels, between the latter and the columns, so as to raise the carriage and transfer it to the clearing track. The columns may be utilized for guiding the fork lift truck.

I claim:

1. A storing plant having a supporting structure with columns and extending over at least one level comprising:
    a plurality of paths constituting an orthogonal network with free spaces therebetween;
    a plurality of carriages overlying said free spaces and adapted to travel on said paths in two orthogonal directions (x, y) of said network;
    said carriages being provided with two trains of wheels (8, 9) having their axes disposed at right angles to each other and the rolling planes shifted vertically to each other, clearance (10, 51) being provided to permit the passage of the lower wheels (8) when the load carriages roll on the upper wheels (9);
    each of said carriage having two carriage driving means (38, 39) aligned along one of said orthognal directions (x) and placed respectively approximately at mid-distance between an edge of the carriage and its center;
    first means for moving said carriages along a complete transverse row in a first direction (y) consisting of a first robot carriage (18) adapted to roll in the transverse row (y) on the path network, for moving a carriage to and from the free spaces, said first robot carriage being carried in turn, when inoperative, by a second robot carriage (23) adapted to travel on a lateral path (24, 25) extending along a longitudinal side of the supporting structure;
    second means for moving said carriages in a second direction (x) through a distance corresponding to said transverse row and comprising longitudinal means extending beneath said paths adapted to move longitudinally by a distance equal to one half the width of the row, and further adapted to engage said carriage drive means, whereby each carriage is moved longitudinally across one row by two half strokes of said longitudinal means.

2. A storing plant according to claim 1, characterized in that the carriages are provided along their sides parallel to said transverse direction (y) with bumpers mounted by means of a pair of links pivoted to vertical pins, whereby a longitudinal pressure exerted on said bumpers will cause them to move towards the load carriage just to permit their passage between the columns of the supporting structure, return means being provided for restoring said bumpers to their initial spaced position when said longitudinal pressure is discontinued.

3. A storing plant according to claim 2, characterized in that the bumpers comprise bent end portions parallel to the other sides of the load carriage, said return means consisting of coil compression springs mounted between said bent end portions and the carriage frame.

4. A storing plant according to claim 3, characterized in that the bent end portions of the bumpers are preceded by an oblique portion constituting a ramp for guiding the carriage during its passage between a pair of adjacent columns of said supporting structure.

5. A storing plant according to claim 1, characterized in that the upper wheels (9) are allowed a limited axial movement.

6. A storing plant according to claim 1, characterized in that the rolling paths consist of pressed U-section metal sheets formed with a longitudinal central rib (33;33') between crossing of the path network, each pressed sheet providing two wheel races (1',2') for a pair of parallel paths, the pressed U-section metal sheets of the wheel races (1') for the lower wheels (8) being formed with transverse channels (51) having the shape of a wide-angle V in cross-section, said channels constituting said clearances for the lower wheels (8), whereby when said lower wheels engage laterally said transverse channels said upper wheels (9) engage their wheel races (2') to free said lower wheels.

7. A storing plant according to claim 6, characterized in that the wheel races (2) for the upper wheels are provided with clearance channels (10) under the lower wheels whereby the lower wheels do not engage said wheel races (2) for the upper wheels while the carriage rolls on said upper wheels, and at right angle thereto other clearance recesses (49) for said upper wheels (9) provided at crossings between two wheel races (1,2) adapted to keep the upper wheels from engaging said wheel races while said carriage rolls across said clearance channels on said lower wheels, having a length corresponding to the length of the downward movement of said lower wheels (8) into said channels.

8. A storing plant according to claim 7, characterized in that the wheel races (2) for said upper wheels (9) comprises recesses for positioning the carriages in the inoperative position thereof.

9. A storing plant according to claim 1, characterized in that the carriage drive means provided underneath the carriages comprises a pair of recesses and said longitudinal means comprise pneumatically operated vertical pins (16), a first pin driving said carriage by engaging the first recess during a first longitudinal movement of said bar, a second pin driving said carriage by engaging its second recess during a second longitudinal movement of said bar.

10. A storing plant according to claim 9, characterized in that the wheel races (1;1') for the lower wheels (8) comprise recesses (50) at least in the positions where said lower wheels are stopped after the first half-stroke of said lateral movement.

11. A storing plant according to claim 1, characterized in that each carriage is being provided on at least one side with transverse (y) drive means, with means for positioning the carriage along both axes (x and y), said transverse (y) drive means consisting of a first robot carriage adapted to roll transversely on said network for introducing and removing a robot carriage being carried in turn, when inoperative by a second robot carriage adapted to travel on a lateral path extending along a longitudinal side of the carrier structure, said longitudinal means consisting of chains extending longitudinally beneath said supporting structure and registering with free spaces, and being connected to to-and-fro drive means and provided with vertically movable drive pins adapted to engage said carriage drive means.

12. A storing plant according to claims 1, 9 or 11, characterized in that the paths consist of smooth plain surfaces having a low coefficient of friction, and said carriages are provided with shoes, channel means being formed in the transverse paths (y) for rolling engagement by said first robot carriage, the width of said channel means being smaller than that of said shoes.

13. A storing plant according to claim 12, for cold stores, characterized in that the smooth plain surfaces consist of a frozen liquid.

* * * * *